(12) United States Patent
Isoyama

(10) Patent No.: US 8,013,922 B2
(45) Date of Patent: Sep. 6, 2011

(54) MODE SELECTION APPARATUS AND DIGITAL CAMERA

(75) Inventor: Tomoya Isoyama, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 973 days.

(21) Appl. No.: 10/490,404

(22) PCT Filed: Sep. 24, 2002

(86) PCT No.: PCT/JP02/09802
§ 371 (c)(1),
(2), (4) Date: Mar. 23, 2004

(87) PCT Pub. No.: WO03/028365
PCT Pub. Date: Apr. 3, 2003

(65) Prior Publication Data
US 2004/0246358 A1    Dec. 9, 2004

(30) Foreign Application Priority Data

Sep. 26, 2001    (JP) ................................. 2001-292794

(51) Int. Cl.
*H04N 5/222* (2006.01)
*H04N 5/445* (2011.01)
*G06F 3/00* (2006.01)
*G06F 13/00* (2006.01)
*H04N 1/46* (2006.01)
*G09G 5/00* (2006.01)

(52) U.S. Cl. ................ 348/333.02; 348/333.01; 725/37; 725/38; 725/39; 725/40; 358/504; 345/650

(58) Field of Classification Search .......................... 348/ 333.01–333.05, 333.11, 333.12; 345/649, 345/650; 715/821, 830–835, 840, 860
See application file for complete search history.

(56) References Cited

U.S. PATENT DOCUMENTS

| | | | | |
|---|---|---|---|---|
| 6,118,480 A | * | 9/2000 | Anderson et al. | 348/207.99 |
| 6,397,387 B1 | * | 5/2002 | Rosin et al. | 725/44 |
| 6,680,845 B2 | * | 1/2004 | Agata et al. | 361/683 |
| 6,690,391 B1 | * | 2/2004 | Proehl et al. | 715/720 |
| 6,710,771 B1 | * | 3/2004 | Yamaguchi et al. | 345/184 |
| 6,715,003 B1 | * | 3/2004 | Safai | 710/33 |

(Continued)

FOREIGN PATENT DOCUMENTS

JP    2-32275    2/1990
(Continued)

*Primary Examiner* — Lin Ye
*Assistant Examiner* — Chia-Wei A Chen
(74) *Attorney, Agent, or Firm* — Gerald T. Bodner

(57) ABSTRACT

A digital camera (10) has nine imaging setting items. A plurality of operation modes are assigned to each imaging setting item. An imaging operation is performed according to valid operation modes selected for each imaging setting item one by one. When a mode key (50) is operated, three valid mode characters out of nine valid mode characters respectively corresponding to nine valid operation modes are displayed on a monitor (30). When a jog dial key (48) is operated, a display of the valid mode characters is renewed. As to the imaging setting item at the reference position, invalid operation modes are detected, and invalid mode characters indicative of the detected invalid operation modes are additionally displayed on the monitor (30). When a set key (44) is operated in a state that a cursor is pointed to an arbitrary invalid mode character, an operation mode corresponding to the invalid mode character is validated.

19 Claims, 8 Drawing Sheets

U.S. PATENT DOCUMENTS

| | | | |
|---|---|---|---|
| 6,795,097 B1 * | 9/2004 | Yamaguchi et al. | 715/810 |
| 6,879,342 B1 * | 4/2005 | Miller et al. | 348/333.05 |
| 6,993,727 B2 * | 1/2006 | De Ceulaer et al. | 715/843 |
| 7,017,184 B2 * | 3/2006 | Kitazawa et al. | 726/20 |
| 7,076,734 B2 * | 7/2006 | Wolff et al. | 715/720 |
| 7,093,201 B2 * | 8/2006 | Duarte | 715/853 |
| 7,155,674 B2 * | 12/2006 | Breen et al. | 715/719 |
| 7,503,057 B2 * | 3/2009 | Rosin et al. | 725/44 |
| 7,834,849 B2 * | 11/2010 | Hunleth et al. | 345/158 |
| 7,839,385 B2 * | 11/2010 | Hunleth et al. | 345/158 |
| 2002/0008765 A1 * | 1/2002 | Ejima et al. | 348/239 |
| 2003/0001907 A1 * | 1/2003 | Bergsten et al. | 345/853 |
| 2009/0144775 A1 * | 6/2009 | Rosin et al. | 725/44 |

FOREIGN PATENT DOCUMENTS

| | | |
|---|---|---|
| JP | 02-032275 | 2/1990 |
| JP | 05-292358 | 11/1993 |
| JP | 06-098224 | 4/1994 |
| JP | 08-305872 | 11/1996 |
| JP | 11-331665 | 11/1999 |
| JP | 2001-211368 | 3/2001 |
| JP | 2002-232830 | 8/2002 |
| JP | 2003-008946 | 1/2003 |

* cited by examiner

| IMAGING SETTING ITEM | VALID OPERATION MODE |
|---|---|
| SENSITIVITY | ISO200 |
| METERING MODE | MULTI-METERING |
| EXPOSURE CONTROL MODE | PROGRAM AE |
| WHITE BALANCE ADJUSTMENT MODE | AUTO |
| FOCUS ADJUSTMENT MODE | SPOT FOCUS |
| RESOLUTION | 2880 |
| SELF-TIMER | ON |
| NOISE REDUCTION | OFF |
| COMPRESSION RATIO | FINE |

MODE SELECTION APPARATUS AND DIGITAL CAMERA

TECHNICAL FIELD

The present invention relates to a mode selecting apparatus applied to a digital camera, for example. More specifically, the present invention relates to a mode selecting device of an electronic apparatus which performs an operation according to valid operation modes which are selected for each setting item one by one out of a plurality of operation modes assigned to each of L of setting items.

PRIOR ART

In a conventional digital camera, when a mode key is depressed, a plurality of imaging setting items are displayed on a monitor, and an imaging setting is changed in response to an operation of a cross key and a set key. However, a limitation in a size of the monitor causes a problem that the number of imaging setting items to be displayed is restricted. Herein, if a hierarchical structure is applied to the imaging setting items, it is possible to adapt to an increase of the number of items, resulting in a complication of an operation.

SUMMARY OF THE INVENTION

Therefore, it is a primary object of the present invention to provide a novel mode selecting device.

Another object of the present invention is to provide a mode selecting device capable of increasing the number of setting items and decreasing a complication of an operation.

The other object of the present invention is to provide a novel digital camera.

A further object of the present invention is to provide a digital camera capable of increasing the number of setting items and decreasing a complication of an operation.

According to the present invention, a mode selecting device of an electronic apparatus which performs an operation according to valid operation modes which are selected for each setting item one by one out of a plurality of operation modes assigned to each of L of the setting items, comprising: a first displaying means for displaying M (M<L) of first character(s) out of L of the first characters respectively corresponding to L of the valid operation modes; a renewing means for renewing, in response to a key operation, the first characters to be displayed by the first displaying means; a detecting means for detecting operation mode(s) except for the valid operation mode out of the plurality of operation modes assigned to a setting item corresponding to a first character displayed at a reference position; a second displaying means for additionally displaying second character(s) corresponding to the operation mode(s) detected by the detecting means; and an accepting means for accepting a selection of an arbitrary second character displayed by the second displaying means.

The plurality of operation modes are assigned to each of the L of the setting items. The operation is performed according to the valid operation mode selected for each setting item one by one. The first displaying means displays the M (M<L) of the first character(s) out of the L of the first characters respectively corresponding to the L of the valid operation modes. When the key operation is performed, the display of the first character(s) is renewed by the renewing means. The detecting means detects the operation mode(s) except for the valid operation mode out of the plurality of operation modes assigned to the setting item corresponding to the first character displayed at the reference position. The second character(s) corresponding to the detected operation mode(s) are additionally displayed by the second displaying means. The selection of the arbitrary second character displayed is accepted by the accepting means.

That is, a part of the first characters are displayed, and furthermore, the second characters relating to the first character which exists at the reference position are additionally displayed. The first character(s) to be displayed are renewed in response to the key operation, and therefore, the second character(s) are also renewed in response to the key operation. Thus, it is possible to increase the number of setting items and, at the same time, to reduce the complication of the operation.

Preferably, the renewing means renews the first character(s) by N (N<M) in response to the key operation. Thus, it is possible to grasp a positional relationship between the L of the first characters.

Preferably, the L of the first characters are circularly successive, and the renewing means performs a renewal process in response to an operation of a jog dial key. Thus, an operation of the dial in one direction makes it possible to display the second character(s) of a desired setting item.

It may be possible that a name of the setting item corresponding to the first character displayed at the reference position is displayed by a third displaying means. Thus, even if the first character displayed at the reference position is abstractive, a content of the selected setting item can be recognized with ease.

Preferably, an arbitrary image is displayed by an image displaying means. At this time, the first character(s) and the second character(s) are superposed on the arbitrary image by the first displaying means and the second displaying means, respectively. The first displaying means displays only the part of the first character(s) (M out of L), and the second displaying means displays only the second character(s) relating to the first character displayed at the reference position, and therefore, a display of the image is less prevented.

One aspect of the present invention is a mode selecting method of an electronic apparatus which performs an operation according to valid operation modes which are selected for each setting item one by one out of a plurality of operation modes assigned to each of L of the setting items, including following steps of: (a) displaying M (M<L) of first character(s) out of L of the first characters respectively corresponding to L of the valid operation modes; (b) renewing, in response to a key operation, the first character(s) to be displayed by the step (a); (c) detecting operation mode(s) except for the valid operation mode out of the plurality of operation modes assigned to a setting item corresponding to a first character displayed at a reference position; (d) additionally displaying second character(s) corresponding to the operation mode(s) detected by the step (c); and (e) accepting a selection of an arbitrary second character displayed by the step (d).

Furthermore, another aspect of the present invention is a control method of a digital camera which performs an imaging operation according to valid operation modes which are selected for each imaging setting item one by one out of a plurality of operation modes assigned to each of L of the imaging setting items, including following steps of: (a) displaying M (M<L) of first character(s) out of L of the first characters respectively corresponding to L of the valid operation modes; (b) renewing, in response to a key operation, the first character(s) to be displayed by the step (a); (c) detecting operation mode(s) except for the valid operation mode out of the plurality of operation modes assigned to an imaging setting item corresponding to a first character displayed at a reference position; (d) additionally displaying second character(s) corresponding to the operation mode(s) detected by the step (c); and (e) accepting a selection of an arbitrary second character displayed by the step (d).

According to the present invention, a digital camera which performs an imaging operation according to valid operation modes which are selected for each imaging setting item one by one out of a plurality of operation modes assigned to each of L of the imaging setting items, comprising: a first displaying means for displaying M (M<L) of first character(s) out of L of the first characters respectively corresponding to L of the valid operation modes; a renewing means for renewing, in response to a key operation, the first character(s) to be displayed by the first displaying means; a detecting means for detecting operation mode(s) except for the valid operation mode out of the plurality of operation modes assigned to an image setting item corresponding to a first character displayed at a reference position; a second displaying means for additionally displaying second character(s) corresponding to the operation mode(s) detected by the detecting means; and an accepting means for accepting a selection of an arbitrary second character displayed by the second displaying means.

The plurality of the operation modes are assigned to each of the L of the imaging setting items. The imaging operation is performed according to the valid operation modes selected for each imaging setting item one by one.

The first displaying means displays the M (M<L) of the first character(s) out of the L of the first characters respectively corresponding to the L of the valid operation modes. When the key operation is performed, the display of the first character(s) is renewed by the renewing means. The detecting means detects the operation mode(s) except for the valid operation mode out of the plurality of operation modes assigned to the setting item corresponding to the first character displayed at the reference position. The second character(s) corresponding to the detected operation mode(s) are additionally displayed by the second displaying means. The selection of the arbitrary second character displayed is accepted by the accepting means.

That is, a part of the first character(s) are displayed, and furthermore, the second character(s) relating to the first character which exists in the reference position are additionally displayed. The first character(s) to be displayed are renewed in response to the key operation, and therefore, the second character(s) are also renewed in response to the key operation. Thus, it is possible to increase the number of the imaging setting items and, at the same time, to reduce the complication of the operation.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an illustrative view showing a table in which valid operation modes of the imaging setting items are registered;

BEST MODE FOR PRACTICING THE INVENTION

Figure 1:
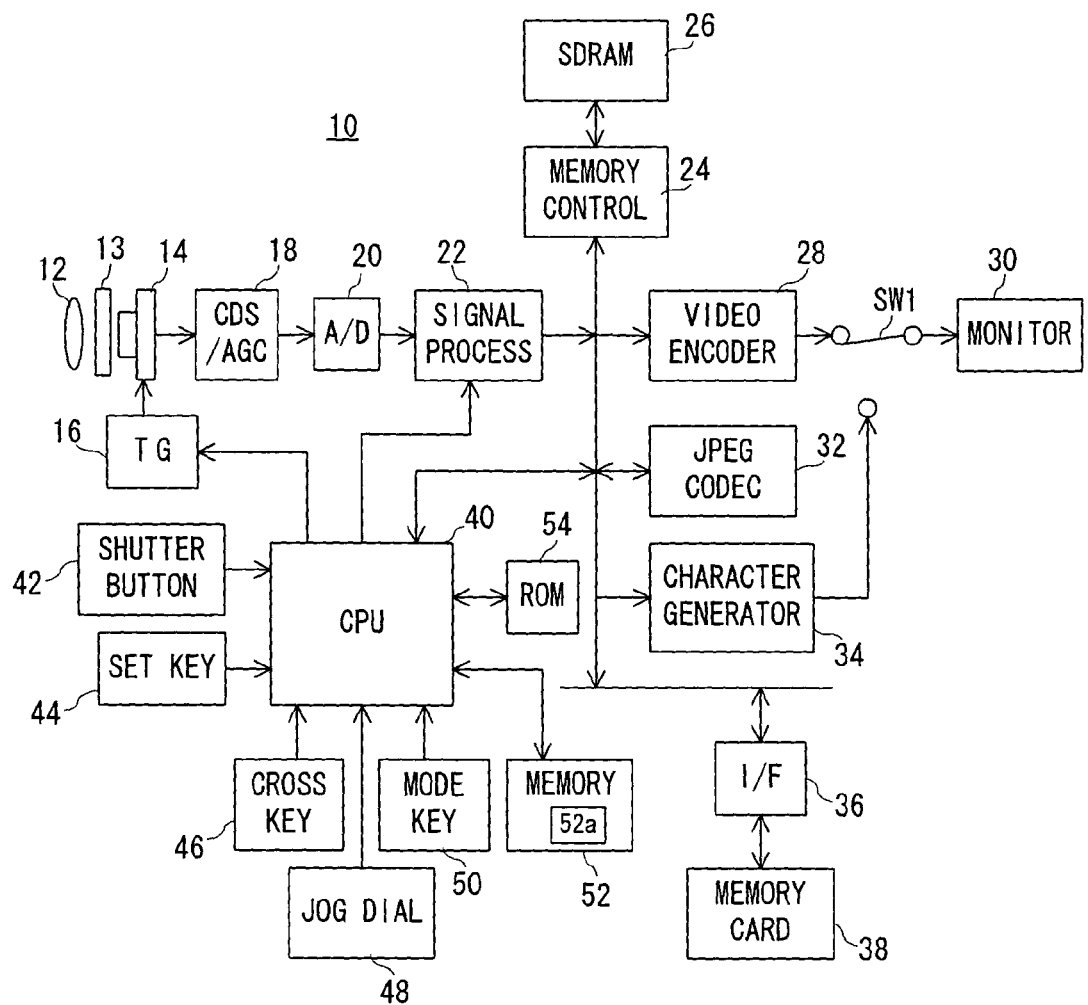
FIG. 1 is a block diagram showing one embodiment of the present invention.

Referring to FIG. 1, a digital camera 10 of this embodiment includes a focus lens 12. An optical image of an object is incident onto a light-receiving surface of the image sensor 14 through the focus lens 12 and an aperture unit 13. On the light-receiving surface, a camera signal corresponding to the incident optical image, i.e., raw image signal is generated by a photo-electronic conversion. It is noted that the light-receiving surface is covered with a primary color filter (not shown) having a Bayer array, and each of pixel signals forming the camera signal has color information of R, G or B.

When a power source is turned on, a through image processing is performed by a CPU 40. First, a processing instruction is applied to a timing generator (TG) 16, and the image sensor 14 is driven by the timing generator 16. The image sensor 14 performs a thin-out reading on the camera signal generated by the photo-electronic conversion at a predetermined frame rate. Each frame of the camera signal output from the image sensor 14 is subjected to a well-known noise removal and a level adjustment by a CDS/AGC circuit 18, and then converted into a digital signal by an A/D converter 20.

A signal processing circuit 22 performs, in response to a processing instruction from the CPU 40, a signal processing such as a color separation, a white balance adjustment, a YUV conversion and etc. on each frame of camera data output from the A/D converter 20 so as to generate image data constructed by a luminance component (Y data) and color difference components (U data and V data). The generated image data is applied to a memory control circuit 24 so as to be written to an SDRAM 26 by the memory control circuit 24.

A video encoder 28 makes the memory control circuit 24 read the image data in the SDRAM 26 in response to a processing instruction from the CPU 40. The video encoder 28 further encodes each frame of the image data read into a composite image signal of an NTSC format, and applies the encoded composite image signal to a monitor 30 through a switch SW1. Thus, a real-time motion image of the object, i.e., a through image is displayed on the monitor 30.

It is noted that the switch SW1, when a character signal is output from a character generator 34, is connected to the character generator 34. The character signal is applied to the monitor 30 via the switch SW1, and thus, a desired character is displayed on the screen in an OSD manner.

When a shutter button 42 is half-depressed by an operator, the CPU 40 performs a pre-adjustment process according to a setting by the operator. As items settable by the operator with respect to an imaging operation, that is, imaging setting items, there are nine items of a sensitivity (ISO100/ISO200/ISO400), a metering mode (spot metering/centerweighted metering/multi-metering), an exposure control mode (aperture priority/shutter speed priority/program AE/manual), a white balance adjustment mode (fluorescent lamp/sunlight/incandescent lamp/cloudiness), a focus adjustment mode (spot focus/multi-focus), a resolution (3264/2880/2288/1600/640), a self-timer (turn-on/turn-off), a noise reduction (turn-on/turn-off), a compression ratio (S-FINE/FINE/NORM). It is noted that an operating method when selecting a desired operation mode is described in detail later.

In the pre-adjustment process, a gain of the CDS/AGC circuit 18 is adjusted according to a setting of the sensitivity, an exposure is adjusted according to a setting of the metering mode and the exposure control mode, a white balance adjustment coefficient of the signal processing circuit 22 is determined in accordance with a setting of the white balance adjustment mode, and a focus is adjusted according to a setting of the focus adjustment mode. For example, if the "ISO 400" is selected as the sensitivity, a gain corresponding to the ISO 400 is set to the CDS/AGC circuit 18. Furthermore, if the "centerweighted metering" and the "aperture priority" are respectively selected as the metering mode and the exposure control mode, a brightness is measured on the basis of Y data in which the center of the screen is weighted, and then, an optimal shutter speed is calculated on the basis of the measured result. In addition, if the "incandescent lamp" is selected as the white balance adjustment mode, an optimal white balance adjustment coefficient is calculated in view of a light source of the incandescent lamp. Still furthermore, when the "spot focus" is selected as the focus adjustment mode, a position of the focus lens 12 is adjusted on the basis of a high-frequency component of the Y data at the center of the screen.

When the shutter button 42 is full-depressed after completion of such the pre-adjustment, an imaging/recording process is performed by the CPU 40. First, a pixel reading according to the setting of the resolution is instructed to the TG 16. If the "3264" is selected as the resolution, all pixel reading is instructed to the TG 16 while if the resolution except for the "3264" is selected, the thin-out reading depending upon the selection is instructed to the TG 16. The TG 16 reads a camera signal from the image sensor 14 in a manner corresponding to the instruction from the CPU 40. The read camera signal is converted into image data constructed by a luminance component and color difference components by the same process as the above description, and the converted image data is stored in the SDRAM 26.

It is noted that if a setting of the self-timer is "turned-on", the instruction to the TG 16 is applied after a lapse of a predetermined time period since the shutter button 42 has been full-depressed. Furthermore, if a setting of the noise reduction is "turned-on", the camera signal is once again read after a mechanical shutter (not shown) is closed, and image data based on the read camera signal, i.e., black image data is stored in the SDRAM 26. The black image data is subjected to a subtraction process between the image data previously stored in the SDRAM 26, i.e., the object image data, and this reduces noise specific to the image sensor 14.

When the image data based on the full-depression of the shutter button 42 is stored in the SDRAM 26, the CPU 40 disables the TG 16 and applies to a JPEG codec 32 a Q-factor corresponding to a setting of the compression ratio together with a compression instruction. The Q-factor is the largest when the "NORM" is selected and is the smallest when the "S-FINE" is selected. The JPEG codec 32 makes the memory control circuit 24 read the image data stored in the SDRAM 26 and subjects the read image data to a compression process in compliance with a JPEG format. When a compressed image data having a size corresponding to the Q-factor is obtained, the JPEG codec 32 applies the compressed image data to the memory control circuit 24. The compressed image data is stored in the SDRAM 26 by the memory control circuit 24.

The CPU 40 then reads the compressed image data from the SDRAM 26 through the memory control circuit 24 and records the read compressed image data in a memory card 38 through an I/F circuit 36. Thus, an image file is created within the memory card 38.

It is noted that the memory card 38 is a detachable non-volatile recording medium and becomes accessible by the CPU 40 when being attached to a slot (not shown). Furthermore, out of the imaging/recording process, the process from the exposure to the generation of the compressed image data is an imaging process, and the process of recording the compressed image data in the memory card 38 is a recording process.

Figure 2:
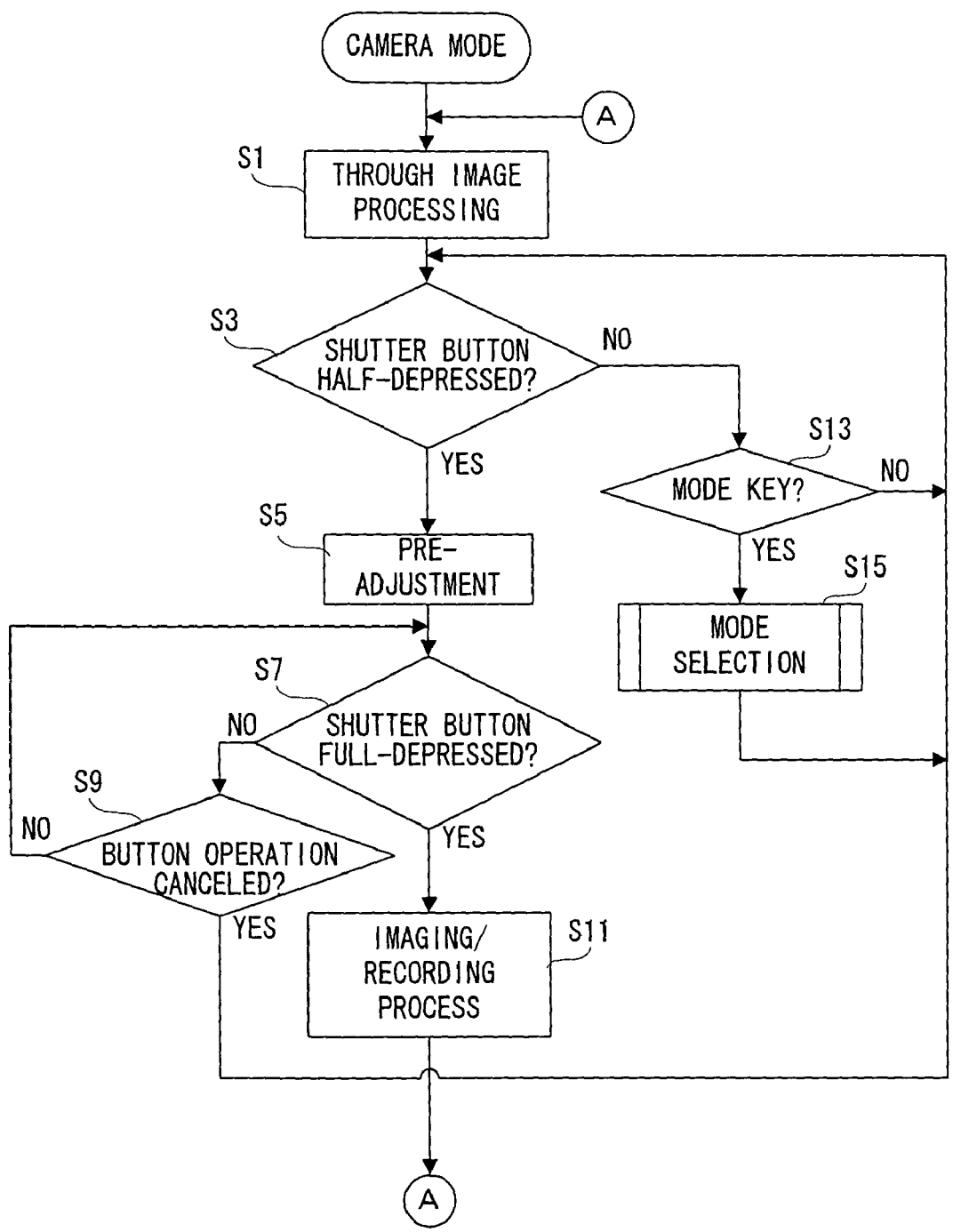
FIG. 2 is a flowchart showing a part of an operation of FIG. 1 embodiment.
Figure 3:
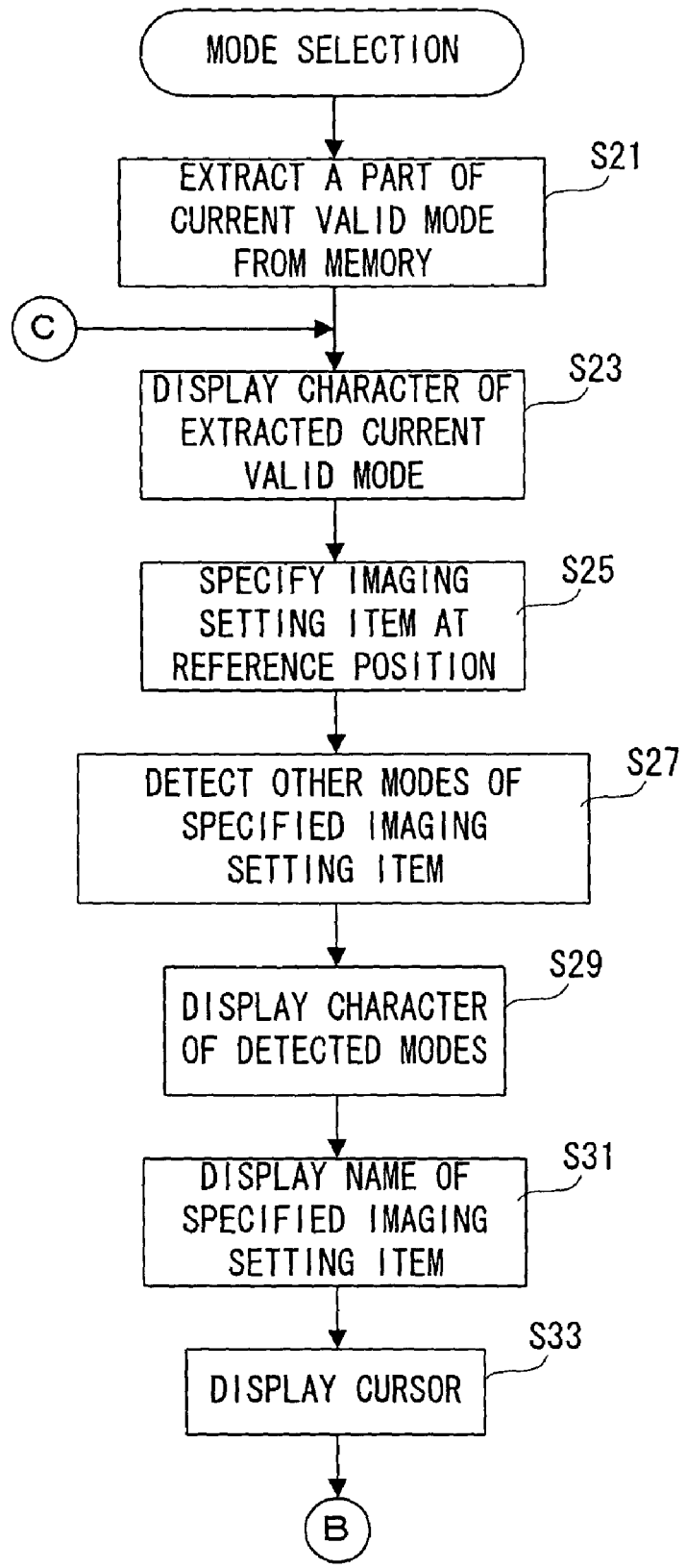
FIG. 3 is a flowchart showing another part of the operation of FIG. 1 embodiment.
Figure 4:
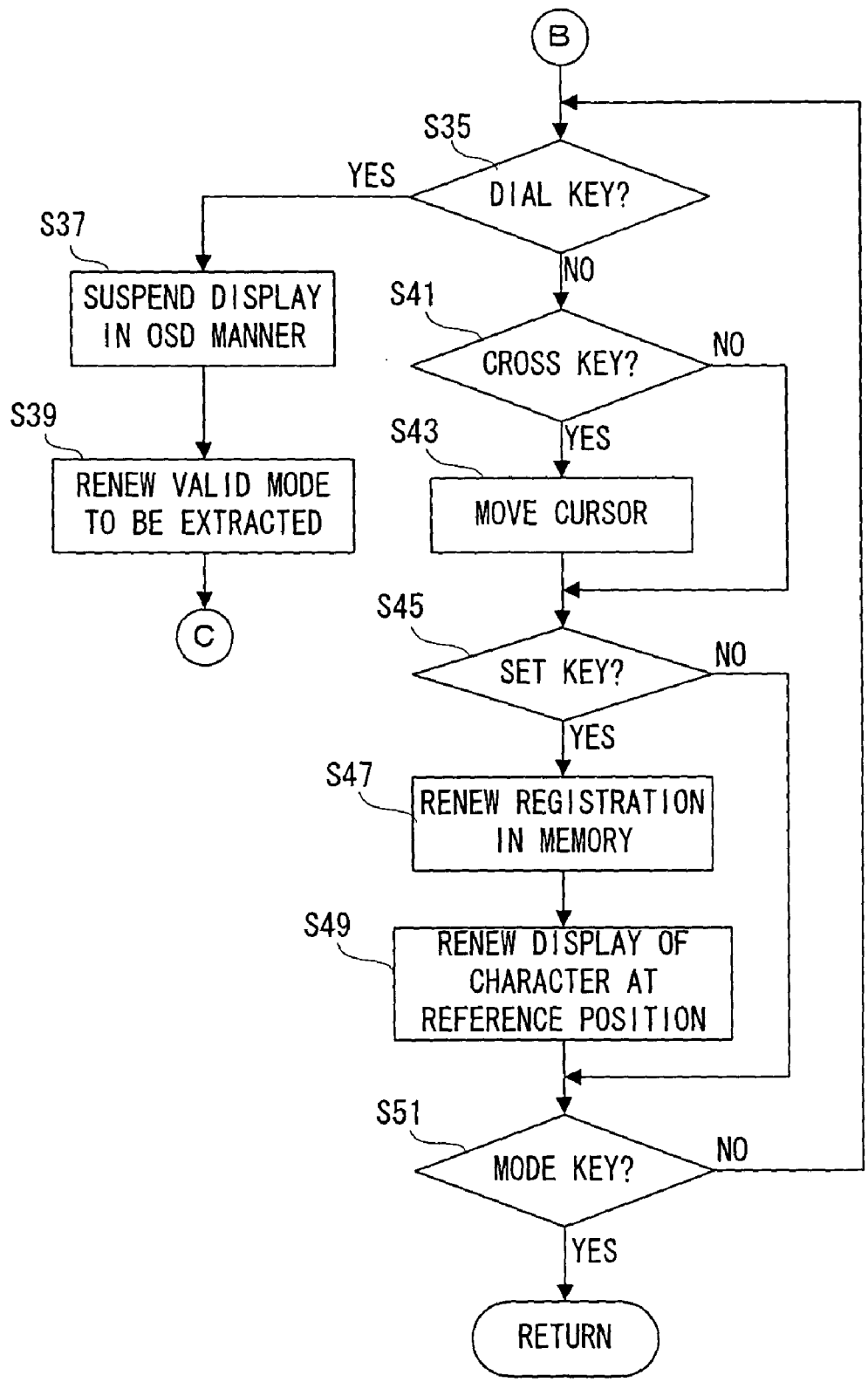
FIG. 4 is a flowchart showing the other part of the operation of FIG. 1 embodiment.

A control program corresponding to flowcharts shown in FIG. 2 to FIG. 4 is recorded in a ROM 54, and the control program is executed by the CPU 40.

In a step S1 shown in FIG. 2, the above-described through image processing is performed. Thus, the through image is displayed on the monitor 30. In a step S3, it is determined whether or not the shutter button 42 is half-depressed, and in a step S13, it is determined whether or not a mode key 50 is operated. When the mode key 50 is operated, a mode selecting process is performed in a step S15, and then, the process returns to the step S3.

When the shutter button 42 is half-depressed, "YES" is determined in the step S3 and then, the above-described pre-adjustment processing is performed in a step S5. Thus, a gain corresponding to a desired sensitivity is set to the CDS/AGC circuit 18, and an exposure, a white balance and a focus are set to an optimal value.

In a step S7, it is determined whether or not the shutter button 42 is full-depressed, and in a step S9, it is determined whether or not the depressed state of the shutter button 42 is canceled. If "YES" is determined in the step S9, the process returns to the step S3 while if "YES" is determined in the step S7, the above-described imaging/recording process is performed in a step S11. Thus, image data at a time of the shutter button 42 being full-depressed is recorded in the memory card 38 in a file format.

The mode selecting process in the step S15 is executed according to a subroutine shown in FIG. 3. First, a part of operation modes currently valid are extracted from a flash memory 52 in a step S21. A table 52a is formed in the flash memory 52 as shown in FIG. 5. According to FIG. 5, the table 52a is divided into nine imaging setting items, and one operation mode is registered for each imaging setting item. The "ISO 200" is registered as the sensitivity, the "multi-metering" is registered as the metering mode, and the "program AE" is registered as the exposure control mode. Furthermore, the "automatic" is registered as the white balance adjustment mode, the "spot focus" is registered as the focus adjustment mode, and the "2880" is registered as the resolution. In addition, the "turn-off" is registered as the self-timer, the "turn-on" is registered as the noise reduction, and the "FINE" is registered as the compression ratio. The operation modes registered in the table 52a are the current valid operation modes, and three valid operation modes out of these operation modes are extracted from the table 52a by the process in the step S21.

The character generator 34 and the switch SW1 are controlled in a step S23, and thereby, the characters corresponding to the valid operation modes extracted from the table 52*a*, i.e., the valid mode characters are displayed on the monitor 30 in an OSD manner. In a step S25, an imaging setting item corresponding to a character displayed at a reference position is specified. In a step S27, invalid operation modes relating to the specified imaging setting item, i.e., operation modes except for the valid operation mode are detected, and in a step S29, the characters corresponding to the detected invalid operation modes, i.e., the invalid mode characters are displayed on the monitor in an OSD manner.

In a step S31, the name of the specified imaging setting item is displayed on the monitor 30 in an OSD manner, and in a step S33, a cursor pointing the character of the valid operation mode which exists at the reference position is displayed on the monitor 30 in an OSD manner. In the steps S29 to S33 also, a character display is performed by controlling the character generator 34 and the switch SW1.

Figure 6:
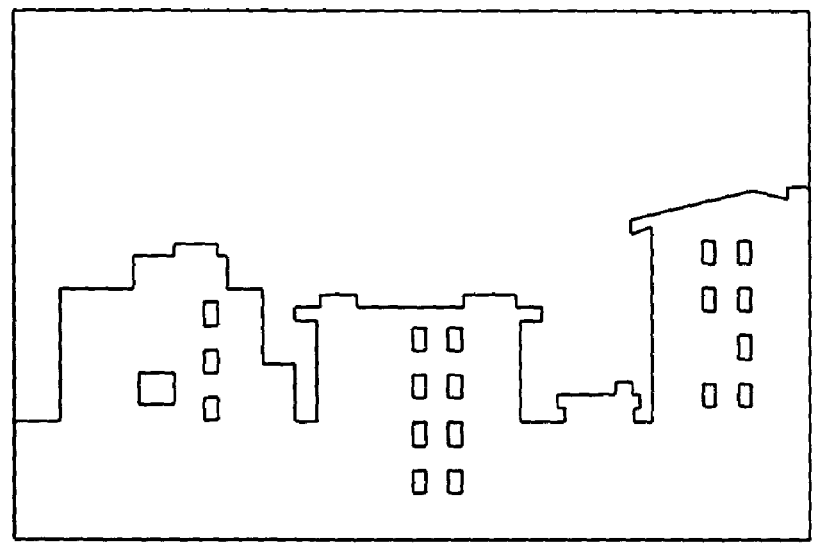
FIG. 6 is an illustrative view showing one example of a through image to be displayed on a monitor.
Figure 7:
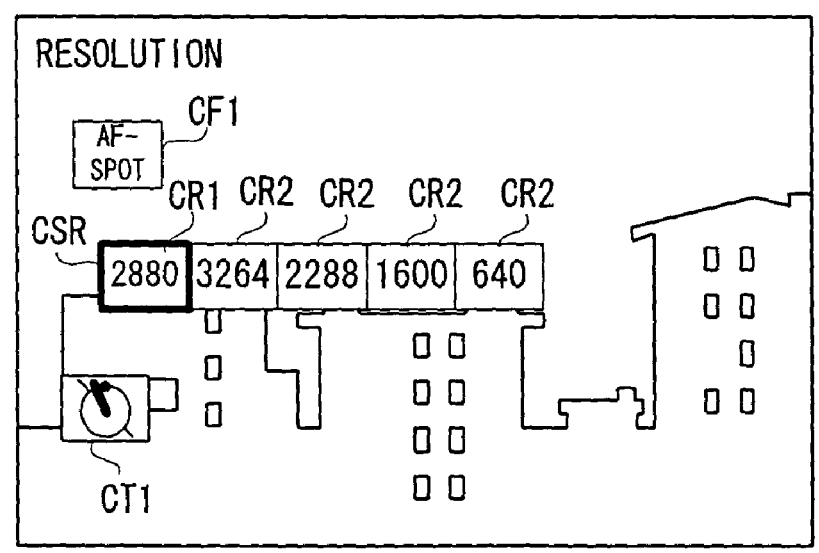
FIG. 7 is an illustrative view showing one example of a menu image displayed in an OSD manner on the through image.

For example, when the mode key 50 is operated at a time of displaying the through image as shown in FIG. 6, a display of the screen is renewed from FIG. 6 to FIG. 7. According to FIG. 7, a character CF1 indicative of the valid operation mode with respect to the "focus adjustment mode", a character CR1 indicative of the valid operation mode with respect to the "resolution", and a character CT1 indicative of the valid operation mode with respect to the "self-timer" are displayed. A displaying position of the character CR1 shown in FIG. 7 is the reference position, and the "resolution" is specified as the imaging setting item at the reference position. Thus, characters CR2, CR2 . . . indicative of the invalid operation mode with respect to the "resolution" are additionally displayed at the right of the character CR1. Furthermore, the "resolution" that is a name of the imaging setting item at the reference position is displayed on the upper right of the screen. A cursor CSR is displayed so as to point to the character CR1 displayed at the reference position.

Figure 11:
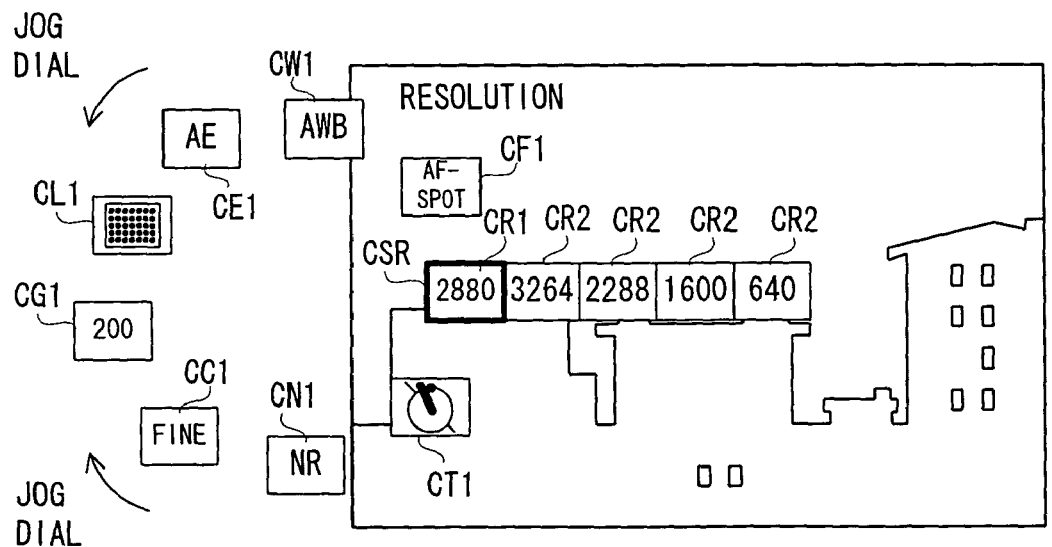
FIG. 11 is an illustrative view showing one example of a positional relationship between a plurality of characters which form the menu screen.

It is noted that respective characters indicative of the valid operation modes registered in the table 52*a* have a positional relationship shown in FIG. 11. Viewing from the character CT1 indicative of the valid operation mode with respect to the "self-timer" in a clockwise direction, a character CN1 indicative of the valid operation mode with respect to the "noise reduction", a character CC1 indicative of the valid operation mode with respect to the "compression ratio", a character CG1 indicative of the valid operation mode with respect to the "sensitivity", a character CL1 indicative of the valid operation mode with respect to the "metering mode", a character CE1 indicative of the valid operation mode with respect to the "exposure control mode", a character CW1 indicative of the valid operation mode with respect to the "white balance", the character CF1 indicative of the valid operation mode with respect to the "focus adjustment mode", and the character CR1 indicative of the valid operation mode with respect to the "resolution" are circularly successive in this order.

In a step S35, it is determined whether or not a jog dial key 48 is operated, and if "YES", all the OSD displays are suspended in a step S37. In a succeeding step S39, the valid operation modes to be extracted from the table 52*a* are renewed. The number of the valid operation modes to be extracted is three, and the renewal is performed every key operation for each mode. When the jog dial key 48 is rotated in a clockwise direction by one step, an access destination in the table 52*a* is shifted in the downward direction by one mode while when the jog dial key 48 is rotated in a counterclockwise direction by one step, the access destination in the table 52*a* is shifted in the upward direction by one mode. After completion of the renewal process in the step S39, the process of the above-described steps S23 to S33 is repeated.

Figure 8:
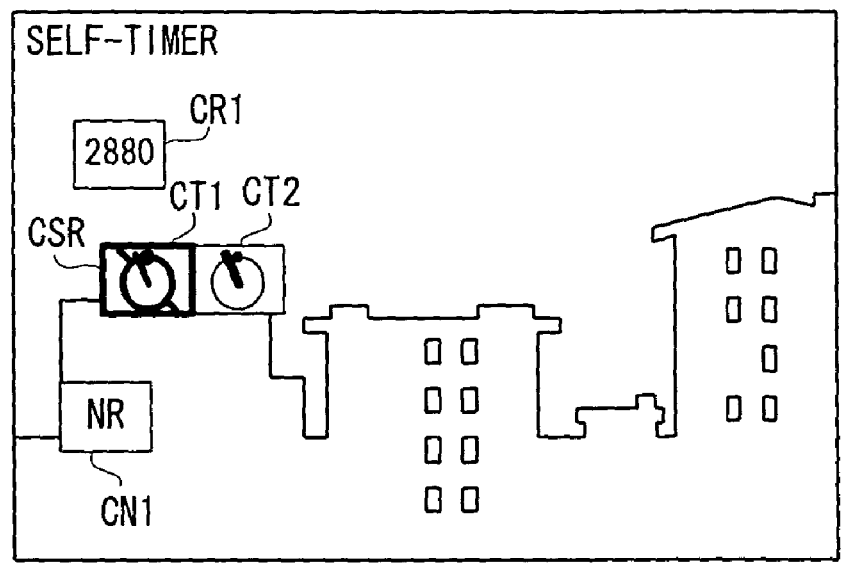
FIG. 8 is an illustrative view showing another example of the menu image displayed in an OSD manner on the through image.

When the jog dial key 48 is rotated in a counterclockwise direction by one step in a displaying state shown in FIG. 7, the screen display is renewed from FIG. 7 to FIG. 8. Furthermore, when the jog dial key 48 is rotated in a clockwise direction by one step in the displaying state shown in FIG. 7, the screen display is renewed from FIG. 7 to FIG. 9.

According to FIG. 8, the character CR1 with respect to the "resolution", the character CT1 with respect to the "self-timer", and the character CN1 with respect to the "noise reduction" are displayed. In FIG. 8, a displaying position of the character CT1 is the reference position, and the "self-timer" is specified as the imaging setting item at the reference position. Thus, the character CT2 indicative of the invalid operation mode with respect to the "self-timer" is additionally displayed at the right of the character CT1. The "self-timer" that is the name of the imaging setting item at the reference position is displayed on the upper left of the screen, and the cursor CSR points to the character CT1 with respect to the "self-timer".

Figure 9:
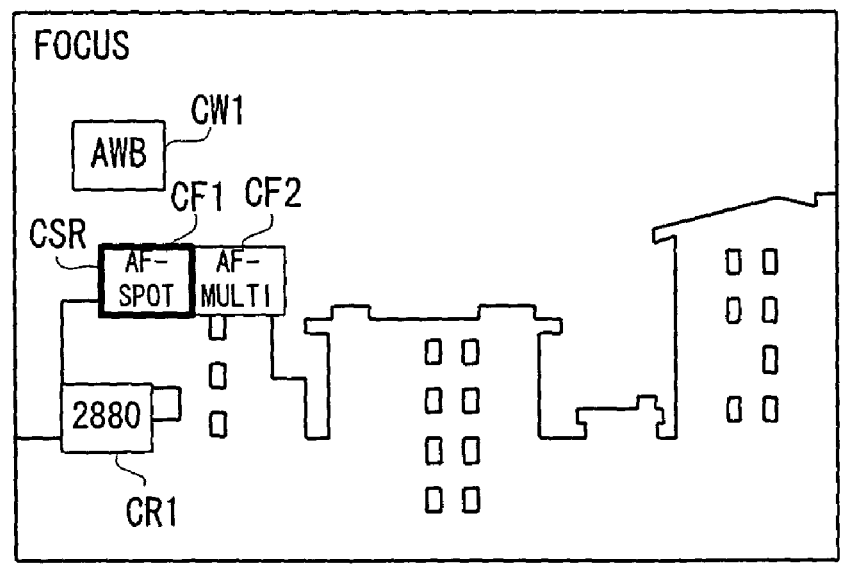
FIG. 9 is an illustrative view showing the other example of the menu image displayed in an OSD manner on the through image.
Figure 10:
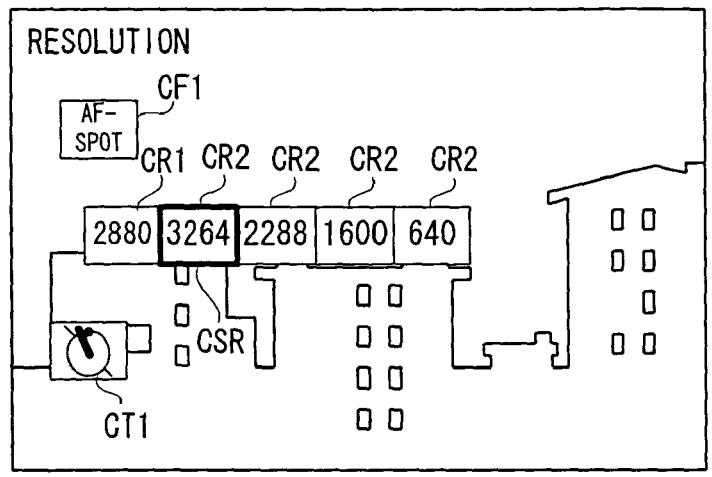
FIG. 10 is an illustrative view showing a further example of the menu image displayed in an OSD manner on the through image.

According to FIG. 9, the character CW1 with respect to the "white balance", the character CF1 with respect to the "focus adjustment mode", and the character CR1 with respect to the "resolution" are displayed. In FIG. 9, a displaying position of the character CF1 is the reference position, and the "focus" is specified as the imaging setting item at the reference position. Thus, the character CF2 indicative of the invalid operation mode with respect to the "focus" is additionally displayed at the right of the character CF1. Furthermore, the "focus" that is the name of the imaging setting item at the reference position is displayed on the upper left of the screen, and the cursor CSR points to the character CF1 with respect to the "focus".

It is noted that respective columns for registration in the table 52*a* are also circularly successive in a vertical direction. Thus, when the jog dial key 48 is rotated in a clockwise direction in a state that the characters CT1, CN1 and CC1 respectively corresponding to the "self-timer", the "noise reduction" and the "compression ratio" are displayed, the "noise reduction", the "compression ratio" and the "sensitivity" become a following access destination. Conversely, when the jog dial key 48 is rotated in a counterclockwise direction in a state the characters CG1, CL1 and CE1 respectively corresponding to the "sensitivity", the "metering mode" and the "exposure control mode" are displayed, the "compression ratio", the "sensitivity" and the "metering mode" become a following access destination.

When the jog dial key 48 is not operated, it is determined whether or not a cross key 46 is operated in a step S41, it is determined whether or not a set key 44 is operated in a step S45, and it is determined whether or not the mode key 50 is operated in a step S51. When the cross key 46 is operated in a left/right direction, "YES" is determined in the step S41, and then, the cursor CSR is moved in the left/right direction in a step S43. For example, when the cross key 46 is operated in the right direction in a state shown in FIG. 7, the screen display is renewed from FIG. 7 to FIG. 10.

When the set key 44 is operated, "YES" is determined in the step S45. Thereupon, the registration of the table 52*a* is renewed in a step S47, and the character display at the reference position is renewed in a step S49. For example, when the set key 44 is operated in a displaying state shown in FIG. 10, the registration of the resolution in the table 52*a* is renewed from the "2880" to the "3264". Such a change of the valid operation mode causes the display of the characters CR1 and CR2 to be changed. That is, the character of "3264 is displayed at the reference position as the character CR1, and the character of "2880" is displayed at the right of the reference position as the character CR2. It is noted that when the mode key 50 is operated, "YES" is determined in a step S51, and the process is restored to a hierarchical upper routine.

As can be understood from the above description, a plurality of operation modes are assigned to each of nine imaging setting modes. The imaging operation is performed according to the valid operation modes to be selected for each imaging setting item one by one. When the mode key 50 is operated, three valid mode characters out of nine valid mode characters respectively corresponding to nine valid operation modes are displayed on the monitor 30. When the jog dial key 48 is operated, the display of the valid mode characters is renewed. As to the imaging setting item at the reference position, the invalid operation modes are detected, and the invalid mode characters indicative of the invalid operation modes are additionally displayed on the monitor 30. When the set key 44 is operated in a state the cursor is pointed to an arbitrary invalid mode character, the operation mode corresponding to the invalid mode character is validated.

Thus, a part of the valid mode characters are displayed on the monitor 30, and furthermore, the invalid mode characters relating to the valid mode character at the reference position are additionally displayed on the monitor 30. The valid mode character to be displayed is renewed in response to the operation of the jog dial key 48, and therefore, the invalid mode characters are also renewed in response to the key operation. This makes it possible to increase the number of the imaging setting items and reduce a complication of the operation for selecting the characters.

It is noted that although a description is made by use of the digital camera in this embodiment, the mode selecting apparatus of the present invention is applicable to an electronic device except for the digital camera. For example, if the present invention is applied to a portable phone, a "ring tone volume", a "ring tone pattern", a "key operation tone", a "sound effect" and etc. are setting items with respect to a sound. At this time, a "volume 1", a "volume 2" and a "volume 3" are assigned as the operation modes of the "ring tone volume", and a "pattern 1", a "pattern 2", and a "volume 3" are assigned as the operation modes of the "ring tone pattern". Furthermore, "turn-on" and "turn-off are assigned as the "key operation sound", and "turn-on" and "turn-off" are assigned as the "effective sound".

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mode selecting device of an electronic apparatus which performs an operation according to a table in which valid operation modes being selected for each setting item one by one out of a plurality of operation modes assigned to each of L of the setting items are successively registered, said electronic apparatus being operated through operation of a plurality of keys, comprising:
   a display, the display having a reference position associated therewith, the reference position being a designated location on the display;
   an extractor which extracts successive M of valid operation modes from said table;
   a first displayer which displays respectively at positions including said reference position on the display M (M<L) of first characters out of L of the first characters respectively corresponding to L of the valid operation modes, said M of said first characters respectively corresponding to said successive M of valid operation modes extracted by said extractor;
   a first key operation acceptor which accepts a first key operation to select said successive M of valid operation modes;
   an extraction renewer which renews, in response to the first key operation accepted by said first key operation acceptor, the valid operation modes to be extracted by said extractor;
   a detector which detects a plurality of operation modes except for the valid operation mode corresponding to the first character displayed at the reference position on the display by said first displayer;
   a second displayer which additionally concurrently displays on the display at least one second character corresponding to the operation modes detected by said detector with respect to said first character;
   a second acceptor which accepts a second key operation to select the second character displayed by said second displayer;
   a table renewer which renews said table, in response to the second key operation accepted by said second key operation acceptor, by registering the operation mode corresponding to a selected second character as the valid operation mode; and
   a display changer which changes the display, in response to the table renewer, to display in the reference position the selected second character corresponding to the operation mode registered by the table renewer as the valid operation mode, said first character being displayed concurrently with said selected second character at a position different from the reference position on the display in response to said table renewer renewing said table by registering the operation mode corresponding to said selected second character as the valid operation mode, the operation mode represented by said selected second character being at the same hierarchical level in the operation of the electronic apparatus as the operation mode represented by said first character concurrently displayed with said selected second character on the display in response to said table renewer renewing said table.

2. A mode selecting device according to claim 1, wherein a renewing amount at a time by said extraction renewer is N being less than M.

3. A mode selecting device according to claim 2, further comprising a jog dial key, wherein said L of the first characters are circularly successive, and said extraction renewer performs a renewal process in response to an operation of said jog dial key.

4. A mode selecting device according to claim 3, further comprising a third displayer which displays on the display a name of the setting item corresponding to the first character displayed at said reference position.

5. A mode selecting device according to claim 4, further comprising a third displayer which displays on the display an arbitrary image, wherein said first displayer superposes said first character(s) on said arbitrary image, and said second displayer superposes said second character(s) on said arbitrary image.

6. A mode selecting device according to claim 3, further comprising a third displayer which displays on the display an arbitrary image, wherein said first displayer superposes said first character(s) on said arbitrary image, and said second displayer superposes said second character(s) on said arbitrary image.

7. A mode selecting device according to claim 2, further comprising a third displayer which displays on the display a name of the setting item corresponding to the first character displayed at said reference position.

8. A mode selecting device according to claim 7, further comprising a third displayer which displays on the display an arbitrary image, wherein said first displayer superposes said first character(s) on said arbitrary image, and said second displayer superposes said second character(s) on said arbitrary image.

9. A mode selecting device according to claim 2, further comprising a third displayer which displays on the display an arbitrary image, wherein said first displayer superposes said first character(s) on said arbitrary image, and said second displayer superposes said second character(s) on said arbitrary image.

10. A mode selecting device according to claim 1, wherein said plurality of keys include a jog dial key, and said first key operation is implemented by said jog dial key.

11. A mode selecting device according to claim 3, further comprising a third displayer which displays on the display a name of the setting item corresponding to the first character displayed at said reference position.

12. A mode selecting device according to claim 11, further comprising a third displayer which displays on the display an arbitrary image, wherein said first displayer superposes said first character(s) on said arbitrary image, and said second displayer superposes said second character(s) on said arbitrary image.

13. A mode selecting device according to claim 10, further comprising a third displayer which displays on the display an arbitrary image, wherein said first displayer superposes said first character(s) on said arbitrary image, and said second displayer superposes said second character(s) on said arbitrary image.

14. A mode selecting device according to claim 1, further comprising a third displayer which displays on the display a name of the setting item corresponding to the first character displayed at said reference position.

15. A mode selecting device according to claim 14, further comprising a third displayer which displays on the display an arbitrary image, wherein said first displayer superposes said first character(s) on said arbitrary image, and said second displayer superposes said second character(s) on said arbitrary image.

16. A mode selecting device according to claim 1, further comprising a fourth displayer which displays on the display an arbitrary image, wherein said first displayer superposes said first characters on said arbitrary image, and said second displayer superposes said second characters on said arbitrary image.

17. A digital camera which performs an imaging operation according to a table in which valid operation modes being selected for each imaging setting item one by one out of a plurality of operation modes assigned to each of L of the imaging setting items are successively registered, said digital camera being operated through operation of a plurality of keys, comprising:
  a display, the display having a reference position associated therewith, the reference position being a designated location on the display;
  an extractor which extracts successive M of valid operation modes from said table;
  a first displayer which displays respectively at positions including said reference position on the display M (M<L) of first characters out of L of the first characters respectively corresponding to L of the valid operation modes, said M of said first characters respectively corresponding to said successive M of valid operation modes extracted by said extractor;
  a first key operation acceptor which accepts a first key operation to select said successive M of valid operation modes;
  an extraction renewer which renews, in response to the first key operation accepted by said first key operation acceptor, the valid operation modes to be extracted by said extractor;
  a detector which detects a plurality of operation modes except for the valid operation mode corresponding to the first character displayed at the reference position on the display by said first displayer;
  a second displayer which additionally concurrently displays on the display at least one second character corresponding to the operation modes detected by said detector with respect to said first character;
  a second acceptor which accepts a second key operation to select the second character displayed by said second displayer;
  a table renewer which renews said table, in response to the second key operation accepted by said second key operation acceptor, by registering the operation mode corresponding to a selected second character as the valid operation mode; and
  a display changer which changes the display, in response to the table renewer, to display in the reference position the selected second character corresponding to the operation mode registered by the table renewer as the valid operation mode, said first character being displayed concurrently with said selected second character at a position different from the reference position on the display in response to said table renewer renewing said table by registering the operation mode corresponding to said selected second character as the valid operation mode, the operation mode represented by said selected second character being at the same hierarchical level in the operation of the digital camera as the operation mode represented by said first character concurrently displayed with said selected second character on the display in response to said table renewer renewing said table.

18. A mode selecting method of an electronic apparatus which performs an operation according to a table in which valid operation modes being selected for each setting item one by one out of a plurality of operation modes assigned to each of L of the setting items are successively registered, said electronic apparatus being operated through operation of a plurality of keys, the electronic apparatus having a display, the display having a reference position associated therewith, the reference position being a designated location on the display, including following steps of:
  (a) extracting successive M of valid operation modes from said table;
  (b) displaying respectively at positions including said reference position on the display M (M<L) of first characters out of L of the first characters respectively corresponding to L of the valid operation modes, said M of said first characters respectively corresponding to said successive M of valid operation modes extracted by said step (a);
  (c) accepting a first key operation to select said successive M of valid operation modes;

(d) renewing, in response to the first key operation accepted by said step (c), the valid operation modes to be extracted by said step (a);
(e) detecting a plurality of operation modes except for the valid operation mode corresponding to the first character displayed at the reference position on the display by said step (b);
(f) additionally concurrently displaying on the display at least one second character corresponding to the operation modes detected by said step (e) with respect to said first character;
(g) accepting a second key operation to select the second character displayed by said step (f);
(h) renewing said table, in response to the second key operation accepted by said step (g), by registering the operation mode corresponding to a selected second character as the valid operation mode; and
(i) changing the display, in response to renewing said table by said step (h), to display in the reference position the selected second character corresponding to the operation mode registered as the valid operation mode by said step (h), said first character being displayed concurrently with said selected second character at a position different from the reference position on the display in response to renewing said table by said step (h) by registering the operation mode corresponding to said selected second character as the valid operation mode, the operation mode represented by said selected second character being at the same hierarchical level in the operation of the electronic apparatus as the operation mode represented by said first character concurrently displayed with said selected second character on the display in response to renewing said table.

19. A control method of a digital camera which performs an imaging operation according to a table in which valid operation modes being selected for each imaging setting item one by one out of a plurality of operation modes assigned to each of L of the imaging setting items are successively registered, said digital camera being operated through operation of a plurality of keys, the digital camera having a display, the display having a reference position associated therewith, the reference position being a designated location on the display, including following steps of:

(a) extracting successive M of valid operation modes from said table;
(b) displaying respectively at positions including said reference position on the display M (M<L) of first characters out of L of the first characters respectively corresponding to L of the valid operation modes, said M of said first characters respectively corresponding to said successive M of valid operation modes extracted by said step (a);
(c) accepting a first key operation to select said successive M of valid operation modes;
(d) renewing, in response to the first key operation accepted by said step (c), the valid operation modes to be extracted by said step (a);
(e) detecting a plurality of operation modes except for the valid operation mode corresponding to the first character displayed at the reference position on the display by said step (b);
(f) additionally concurrently displaying on the display at least one second character corresponding to the operation modes detected by said step (e) with respect to said first character;
(g) accepting a second key operation to select the second character displayed by said step (f);
(h) renewing said table, in response to the second key operation accepted by said step (g), by registering the operation mode corresponding to a selected second character as the valid operation mode; and
(i) changing the display, in response to renewing said table by said step (h), to display in the reference position the selected second character corresponding to the operation mode registered as the valid operation mode by said step (h), said first character being displayed concurrently with said selected second character at a position different from the reference position on the display in response to renewing said table by said step (h) by registering the operation mode corresponding to said selected second character as the valid operation mode, the operation mode represented by said selected second character being at the same hierarchical level in the operation of the digital camera as the operation mode represented by said first character concurrently displayed with said selected second character on the display in response to renewing said table.

* * * * *